United States Patent [19]

Willard, Sr.

[11] 3,915,738

[45] *Oct. 28, 1975

[54] METHOD OF CLEANING GLASS WINDOWS AND MIRRORS

[75] Inventor: John W. Willard, Sr., Rapid City, S. Dak.

[73] Assignee: Caw Industries, Rapid City, S. Dak.

[ * ] Notice: The portion of the term of this patent subsequent to Apr. 1, 1992, has been disclaimed.

[22] Filed: Aug. 20, 1973

[21] Appl. No.: 389,541

Related U.S. Application Data

[63] Continuation-in-part of Ser. No. 317,097, Dec. 20, 1972, which is a continuation of Ser. No. 108,198, Jan. 20, 1971, abandoned.

[52] U.S. Cl. ...................... 134/2; 134/40; 252/109; 252/135; 252/313 S; 252/457; 252/532
[51] Int. Cl.$^2$ ............................................ C03C 23/00
[58] Field of Search ....... 134/2, 40; 252/109, 313 S, 252/428, 429 B, 449, 451, 454, 457, 452, 455 R, 532, DIG. 10, 140

[56] References Cited
UNITED STATES PATENTS

| | | | |
|---|---|---|---|
| 2,037,566 | 4/1936 | Durgin | 252/109 X |
| 2,380,259 | 7/1945 | Pierce | 252/DIG. 10 |
| 2,656,289 | 10/1953 | Miller | 252/DIG. 10 |
| 3,272,753 | 9/1966 | Wixon | 252/532 X |
| 3,350,319 | 10/1967 | Schonfeldt | 252/532 |

*Primary Examiner*—S. Leon Bashore
*Assistant Examiner*—Marc L. Caroff
*Attorney, Agent, or Firm*—L. S. Van Landingham, Jr.

[57] ABSTRACT

Glass surfaces having undesirable foreign substances thereon are cleaned with an aqueous cleaning composition containing water and a catalytically effective amount of a novel catalyst. The aqueous cleaning composition is applied to the glass surface and intimately contacted therewith until the foreign substances may be removed by a wiping action. Thereafter, the glass surface is wiped to remove the foreign substances and any excess aqueous cleaning composition without leaving a film or residue on the clean glass surface. When desirable, the aqueous cleaning composition may also contain a surface active agent or a combination of a surface active agent and a water softening agent. The novel catalyst which is used in preparing the aqueous cleaning composition is prepared by steps including admixing a water soluble alkali metal silicate with an aqueous medium containing carefully controlled amounts of dissolved water soluble substances which are sources of calcium ion and magnesium ion, reacting the same to produce an aqueous finely divided or colloidal suspension of the reaction product, admixing a micelle-forming surfactant with the aqueous medium, and agitating the aqueous medium containing the finely divided or colloidal particles and surfactant to form catalyst-containing micelles.

37 Claims, No Drawings

RELATED APPLICATIONS

This application is a continuation-in-part of copending application Ser. No. 317,097, filed Dec. 20, 1972 on behalf of John W. Willard, Sr. for Novel Catalyst and Process For Preparing The Same. Application Ser. No. 317,097, in turn, is a continuation of application Ser. No. 108,198 filed Jan. 20, 1971, now abandoned.

BACKGROUND OF THE INVENTION

This invention relates to a novel method of cleaning glass surfaces having undesirable foreign substances thereon. The invention is especially useful in removing dirt, oil, grease, stains, films and foreign materials in general from the surface of glass windows and mirrors. a wide variety of compositions have been proposed heretofore for cleaning glass windows and mirrors. Examples of prior art cleaning compositions include aqueous solutions of the alkali metal soaps of long chain fatty acids, synthetic detergents of the anionic, cationic or nonionic types and admixtures thereof. Still other prior art cleaning compositions contain water and an additive such as acetic acid and/or its ammonium and alkali metal salts, aqueous ammonia, and water soluble lower alcohols. In some instances, an aqueous solution containing a combination of one or more of the above additives and one or more of the above surface active agents has been used.

The prior art cleaning compositions are not entirely satisfactory for a number of reasons. For example, some of the prior art cleaning compositions leave noticeable films and/or streaks on the glass surface which detract from the appearance of the cleaned windows and mirrors and prevents the same from performing their intended function in a satisfactory manner. Many of the prior art cleaning compositions are slow acting and are not effective in removing stains and discolorations in general. The prior art cleaning compositions also are generally unsatisfactory due to the large amount of effort required to remove tightly adhering dried films and particles of initially liquid or semi-liquid foreign substances. As a result of the aforementioned and other deficiencies the art has long sought an entirely satisfactory aqueous cleaning composition which rapidly removes undesirable foreign substances from glass surfaces without requiring a great amount of effort, and which does not leave films or streaks on the cleaned glass surface.

It is an object of the present invention to provide a method of cleaning glass surfaces such as windows and mirrors having undesirable foreign substances thereon wherein the glass surfaces are intimately contacted with an aqueous cleaning composition containing water and a novel catalyst.

It is a further object to provide a method of cleaning glass windows and mirrors without an aqueous cleaning composition containing water, a surface active agent and/or a water softening agent, and a catalytically effective amount of a novel catalyst.

Still other objects and advantages of the invention will be apparent to those skilled in the art upon reference to the following detailed description and the specific examples.

DETAILED DESCRIPTION OF THE INVENTION INCLUDING PREFERRED VARIANTS THEREOF

In accordance with the present invention, glass surfaces having undesirable foreign substances thereon, such as soiled glass windows and mirrors, are cleaned with an aqueous cleaning composition containing water and a catalytically effective amount of a novel catalyst to be described more fully hereinafter. The aqueous cleaning composition may contain a surface active agent, or a combination of a surface active agent and a water softening agent in instances where the glass surface is soiled with a foreign substance, such as heavy oils and greases, which is more effectively removed in the presence of a detergent. The aqueous cleaning composition also may contain other common prior art additives for window cleaning compositions but they are not usually necessary or desirable. As a general rule, the foreign substances which are usually deposited on windows and mirrors in houses, apartments, hotels, office buildings, vehicles and the like may be effectively removed with an aqueous cleaning composition which consists of water and a catalytically effective amount of the catalyst. In such instances, it is preferred that the cleaning composition not contain the aforementioned surface active agent and/or water softening agent, or any other additive of the prior art.

In instances wherein the aqueous cleaning composition also contains a surface active agent, it may be selected from the surface active agents used in washing windows and mirrors in accordance with prior art practice. Examples of surface active agents include the alkali metal soaps of long chain fatty acids and especially the sodium and potassium soaps of fatty acids containing 14–25 carbon atoms and preferably about 16–18 carbon atoms. Other surface active agents include detergents which are not derived directly from fatty acids such as synthetic anionic, cationic and nonionic detergents. Specific examples of synthetic anionic detergents include the alkali metal salts of organic sulfonates or organic sulfates, and especially the alkali metal salts of high molecular weight alkyl or alkylaryl sulfonates such as sodium or potassium dodecyl benzene sulfonate, and the sodium and potassium sulfates of straight chain primary alcohols such as sodium lauryl sulfate and other sodium and potassium sulfates of fatty alcohols or products of the "Oxo" process. Specific examples of cationic detergents include the quaternary ammonium halides such as benzethonium chloride, and often members of this group have outstanding germicidal activity as well as surface active properties. Specific examples of nonionic detergents include compounds having a polyoxyethylene or other oxygenated side chain and the remainder of the molecule may be derived from fatty acids, alcohols, phenols, amides and amines.

Further examples of surface active agents are disclosed in the section on detergency appearing in the Kirk-Othmer Encyclopedia of Chemical Technology (2nd Edition), Volume 6, pages 853–895, the disclosure of which is incorporated herein by reference. Still additional specific examples of detergent compositions are found in numerous United States patents, including the following which are incorporated herein by reference:

| | | | |
|---|---|---|---|
| 3,031,510 | 3,119,848 | 3,222,287 | 3,382,177 |
| 3,043,780 | 3,140,261 | 3,223,647 | 3,382,285 |
| 3,048,548 | 3,144,412 | 3,282,852 | 3,422,021 |
| 3,053,771 | 3,156,655 | 3,314,891 | 3,424,689 |
| 3,061,551 | 3,173,877 | 3,320,172 | 3,429,822 |

|           |           | -Continued |           |
|-----------|-----------|------------|-----------|
| 3,067,143 | 3,203,955 | 3,326,807  | 3,437,697 |
| 3,082,172 | 3,208,949 | 3,337,463  | 3,444,242 |
| 3,095,381 | 3,101,374 | 3,349,038  | 3,499,841 |
| 3,101,297 | 3,213,028 | 3,359,205  | 3,507,798 |
| 3,118,000 | 3,215,633 | 3,382,176  |           |

It is understood that the above surface active agents are given by way of example only, and that other suitable surface active agents may be used. A mixture of one or more of the above surface active agents may be used when desired.

In instances where the aqueous cleaning composition also contains a water softening agent, it likewise may be selected from the water softening agents used in prior art window and mirror aqueous cleaning compositions. Examples of water softening agents include washing soda, trisodium phosphate, sodium metaphosphate, sodium tetraphosphate and other substances effective to remove calcium and/or magnesium ions from water. Mixtures of water softening agents may be used. The water softening agent may be employed in the usual amount necessary to soften the water content of the aqueous cleaning composition.

The aqueous composition may also contain one or more additives used in prior art window and mirror cleaning compositions. Examples of prior art additives include water soluble lower organic acids and especially acetic acid and the ammonium and alkali metal salts thereof, lower water soluble alcohols and especially alcohols containing 1–4 carbon atoms, and water soluble bases and especially aqueous ammonia.

The water used in preparing the aqueous cleaning composition may be untreated or softened tap water derived from municipal water sources, wells or springs. A soft water usually gives better results and is preferred. The additives described above, when used, may be admixed with the water in the quantity recommended in accordance with prior art practices, such as ¼–2 cups of surface active agent for each 5–20 gallons of water. However, the catalyst of the invention increases the effectiveness of a given quantity of surface active agent or other additive and the amount required to produce equally satisfactory results is usually about ⅛–½ of that normally required, and often about one-fourth as much, as is used in prior art household and industrial aqueous window washing or mirror washing compositions.

The catalyst is present in the aqueous cleaning composition in a catalytic quantity which results in the desired improvement. Usually the catalyst is present in an amount of about 0.00001–0.1 weight percent, and preferably about 0.0004–0.001 weight percent of the aqueous cleaning composition, but larger or smaller amounts may be present as it is only necessary to provide the catalyst in catalytic amount. The aqueous cleaning composition may be prepared by diluting the aqueous suspension of the catalyst as produced by the process described herein. In such instances, the aqueous suspension of catalyst as produced may be diluted with about 100–10,000 volumes of water and then used. For better results, the aqueous suspension of catalyst as produced may be diluted with about 250–2000 parts of water before use, and for still better results it may be diluted with about 500–1000 parts by weight of water before use. A surface active agent and/or a water softening agent may be added thereto when desired.

Alternatively, when the aqueous cleaning composition contains a surface active agent the catalyst may be added to commercially available solid or liquid surface active compositions such as Ivory Snow, Tide and Thrill, or to the surface active compositions disclosed in the patents listed herein. The catalyst is present in a quantity to provide a catalytic amount when the surface active composition is admixed with water in the recommended ratio to produce a cleaning solution. Usually the catalyst is present in an amount to provide about 0.00001–0.1 weight percent, and preferably about 0.000414–0.001 weight percent in the water that is added thereto at the time of use. Often the catalyst is present in an amount of about 0.01–1 weight percent based upon the weight of the concentrated surface active composition. Larger or smaller amounts may be present as it is only necessary to provide the catalyst in catalytic amounts in the cleaning solution prepared by diluting the surface active composition with water.

The aqueous cleaning composition may be applied to the soiled glass surfaces and intimately contacted therewith until the foreign substances may be removed by a wiping action. Thereafter the glass surface may be wiped to remove the foreign substances and any excess aqueous cleaning composition. The aqueous cleaning composition may be applied to the glass surface by spraying, or with a sponge, cloth, or other absorbent material in the usual manner and preferably in an excess over the quantity required to wet the glass surface. After remaining in contact with the glass surface for the desired period of time, the excess cleaning composition and the foreign substances may be removed with a cloth or a squeegee. In general, the prior art methods and techniques of washing windows, mirrors or other flat glass surfaces may be employed in practicing the present invention and the method of the present invention need differ therefrom only in substituting the aqueous cleaning composition described herein for the prior art cleaning compositions.

The catalyst markedly speeds up the cleaning action and allows the foreign substances to be removed from the glass surfaces in a minimum period of time and with minimum effort. The catalyst is especially effective in the removal of dried intially liquid or semi-liquid films and particles from the glass surfaces. In such instances, the catalyst seems to loosen the bond between the glass surfaces and the foreign substances, thereby allowing the foreign substances to be easily wiped off with a cloth, sponge or squeegee. the catalyst also aids in the uniform and complete removal of films, streaks and residues in general.

the catalyst that is employed in practicing the present invention is unique and has many unusual and unexpected properties. It is presently thought that these unusual and unexpected properties result from the way the catalyst is prepared, and thus it should be prepared following the process described hereinafter.

PREPARATION OF THE CATALYST

The catalyst used in practicing the present invention may be prepared as described below. In the presently preferred process for preparing an aqueous suspension of the catalyst, a water soluble alkali metal silicate is admixed and reacted with an aqueous solution of a water soluble dissolved substance which is a source of calcium ion and a water soluble dissolved substance which is a source of magnesium ion to produce a finely divided or colloidal suspension of the reaction product. The aqueous solution contains the dissolved substances initially in amounts to provide between about $1 \times 10^{-4}$ and $1 \times 10^{-1}$ mole per liter each of calcium ion and magnesium ion, preferably between about $1 \times 10^{-3}$ and $1 \times 10^{-2}$ mole per liter, and for still better results between $1 \times 10^{-3}$ and $6 \times 10^{-3}$ mole per liter. The dissolved substances should also be present in amounts to provide a molar ratio of calcium ion to magnesium ion between about 2.0:1.0 and 1.0:2.0, and preferably about 1.5:1.0 and 1.0:1.5. For best results, the aqueous medium should contain the dissolved substances in amounts to provide between about $2.5 \times 10^{-3}$ and $3.0 \times 10^{-3}$ mole per liter each of calcium ion and magnesium ion, and the molar ratio of calcium ion to magnesium ion should be about 1.0:1.0, e.g., $2.9 \times 10^{-3}$ mole per liter of calcium ion and $2.7 \times 10^{-3}$ mole per liter of magnesium ion. The alkali metal silicate should have an alkali metal oxide to silicon dioxide ratio between about 0.9:1.0 and less than 2.0:1.0, and preferably between about 0.9:1.0 and 1.2:1.0. The alkali metal silicate should be admixed with the aqueous medium in an amount of about 0.05–2 moles per liter, preferably about 0.1–1 mole per liter, and for still better resulter about 0.2–0.5 mole per liter. For best results, the alkali metal silicate should be an alkali metal meta-silicate having an alkali metal oxide to silicon dioxide ratio of about 1:1, and it should be admixed with the aqueous medium in an amount to provide about 0.2–0.3 mole per liter, e.g., about 0.25 mole per liter.

Examples of sources of calcium ion and magnesium ion for use in preparing the aqueous solution include mineral acid salts such as the halides, sulfates, bisulfates, nitrites, and nitrates of calcium and magnesium. The chlorides are usually the preferred halides, and both calcium and magnesium chloride are soluble and may be used. Magnesium sulfate and bisulfate are soluble and often are the preferred sources of magnesium ion. Calcium sulfate is only slightly soluble in water and usually is not a preferred source of calcium ion, but calcium bisulfate is somewhat more soluble. While calcium and magnesium nitrite or nitrate are soluble in water and may be used, these substances are not preferred in most instances. The sources of calcium ion and magnesium ion are dissolved in the aqueous medium in amounts to provide calcium ion and magnesium ion within the above ranges. Complete ionization is assumed when calculating the quantities to be dissolved and any desired order of addition is satisfactory. For example, the source of calcium ion may be added to the aqueous medium before, during or after the source of magnesium ion.

The alkali metal silicate to be admixed with the aqueous medium is preferably a water soluble sodium or potassium silicate having an alkali metal oxide ($M_2O$) to silicon dioxide ($SiO_2$) mole ratio between about 0.9:1.0 and less than 2.0:1.0, and preferably between about 0.9:1.0 and 1.2:1.0. The best results are usually obtained with an alkali metal metasilicate having an alkali metal oxide to silicon dioxide ratio of about 1:1. Hydrated alkali metal silicates dissolve faster and should be used for best results when the alkali metal silicate is added in solid form. In instances where an anhydrous alkali metal silicate is used, it may be desirable to dissolve it in water and then add the solution to the aqueous medium. Sodium metasilicate is preferred and usually a hydrated sodium metasilicate such as the pentahydrate gives the best results.

Carbonate ion and/or bicarbonate ion should not be present in the aqueous medium in substantial concentrations as the calcium ion and magnesium ion are precipitated in the form of their respective carbonates. The free carbonate ion and/or bicarbonate ion concentrations in the aqueous medium should not exceed about 10 parts per million by weight based upon the combined weight of the water and the ingredients added thereto and for this reason, the alkali metal silicates should be substantially free of carbonate ion and bicarbonate ion. A small amount of preciptated calcium carbonate and/or magnesium carbonate may be present in the aqueous medium provided additional calcium ion and magnesium ion are available to meet the above defined concentrations.

Distilled water and/or deionized water are usually preferred over a natural or untreated water when preparing the aqueous medium. In instances where water is used which contains substantial initial concentrations of alkaline earth metal ions, then this should be taken into consideration in calculating the amounts of the sources of calcium ion and magnesium ion which are necessary to arrive at the final concentrations previously discussed.

An electrolyte which aids in the preparation of colloidal suspensions may be present in the aqueous medium at the time of admixing the alkali metal silicate therewith. Examples of electrolytes include those used in preparing prior art colloidal suspensions such as the alkali metal halides, sulfates and bisulfates. Sodium chloride, sodium sulfate and sodium bisulfate are usually preferred. The electrolyte should be added in small amounts such as, for example, about 0.00001–0.1 mole per liter, but often larger or smaller amounts may be present.

The conditions under which the alkali metal silicate is admixed with the aqueous medium and reacted with the sources of calcium ion and magnesium ion are not critical provided the reaction mixture is maintained in the liquid phase. The reaction temperature may be, for example, between the freezing point and boiling point of water under the existing pressure conditions. At atmospheric pressure, the temperature is usually about 10°–90°C and often a more convenient temperature is about 20°–50°C. In many instances, ambient or normal room temperature is satisfactory.

The degree of agitation is not critical, and mild to vigorous agitation may be employed during addition of the alkali metal silicate. For the best results, the aqueous medium should be agitated sufficiently to assure rapid and uniform admixing of the alkali metal silicate. After completing the addition of the alkali metal silicate, when desired the agitation may be continued for a sufficient period of time to assure complete reaction and aging of the resulting colloidal suspension, such as for approximately 1–5 minutes to 1 hour or longer.

Upon admixing the alkali metal silicate with the aqueous medium, it takes on a turbid appearance but in most instances no significant amount of visible precipitate is formed. The colloidal suspension of the reaction product thus produced should be strongly basic and may have a pH value of, for example, approximately 10–14 and preferably about 11–13, and for best results about 12. In view of this, the initial pH value of the aqueous medium containing the dissolved sources of calcium ion and magnesium ion is of importance and should be about 6–9 and preferably about 7–8. When necessary, it is possible to adjust the pH value of the aqueous medium to the foregoing levels either before during or after addition of the alkali metal silicate by adding bases such as sodium or potassium hydroxide, or mineral acids such as sulfuric or hydrochloric acid.

The colloidal suspension may be stored for several weeks or longer while awaiting the further treatment described hereinafter. In instances where the colloidal suspension is to be stored over a substantial period of time, the pH value should be maintained at the above described level and the storage vessel is preferably a tightly capped polyethylene bottle or other inert plastic container which prevents the contents from absorbing carbon dioxide from the atmosphere.

The colloidal suspension of the reaction product is not suitable for use as a catalyst as prepared and it should be agitated sufficiently in the presence of a micelle-forming surfactant to form catalyst-containing micelles. The degree of agitation, the length of the agitation period, and the amount of the micelle-forming surfactant that is present in the colloidal suspension are controlled at levels favorable to the formation of micelles. For example, the surfactant may be present in an amount of about 0.001–0.1 mole per liter and preferably about 0.03–0.07 mole per liter for most surfactants. Smaller or larger amounts may be effective with some surfactants such as 0.0001 mole per liter or less, or 0.2 mole per liter or more. About 0.05 mole per liter often gives the best results with many surfactants.

The minimum period of agitation and the minimum degree of agitation that are required for micelle formation varies somewhat with temperature and the type and amount of surfactant. As is well understood in this art, gradually increasing these variants in the presence of an effective amount of the micelle-forming surfactant will result in micelle formation when the proper levels are reached. As a general rule, longer periods of agitation and/or more vigorous agitation are required to form micelles at lower temperatures approaching the freezing point of the colloidal suspension than at higher temperatures approaching the boiling point. In instances where the aqueous suspension has a temperature of approximately 50°–90°C., then mild agitation over a period of about 10–60 minutes is satisfactory. Often longer or shorter periods of mild to vigorous agitation may be employed such as from about 1–5 minutes to several hours at temperatures varying, respectively, between the boiling point and the freezing point. When desired, the agitation may be continued long after the catalyst-containing micelles are formed as continued agitation does not seem to have an adverse affect.

As a general rule, the micelle-forming surfactants known in the prior art may be used in practicing the present invention. Micelle-forming surfactants used in the emulsion polymerization of monomeric organic compounds are disclosed in the text *Synthetic Rubber*, by G. S. Whitby, et al., John Wiley & Sons Incorporated, New York (1954), and surface active agents in general are disclosed on pages 418–424 of the text *Organic Chemistry*, Fieser and Fieser, 2nd Edition, Reinhold Publishing Corporation, New York, N.Y. (1950), the disclosures of which are incorporated herein by reference. Examples of surfactants disclosed in the above texts include the alkali metal soaps of long chain fatty acids, and especially the sodium and potassium soaps of fatty acids containing about 14–25 carbon atoms and preferably about 16–18 carbon atoms, and the sodium and potassium soaps of the rosin acids, abietic acid and the derivatives thereof. Other micelle-forming surfactants include fats and oils such as corn oil, cotton seed oil, castor oil, soy bean oil and safflower oil which have been fully or partially saponified with alkali metal bases to produce mixtures including saponified long chain fatty acids, the mono- or di-glycerides thereof, and glycerin.

Examples of synthetic micelle-forming surfactants include the sulfonates of long chain alcohols prepared by hydrogenation of naturally ocurring fats and oils of the above types and especially sulfonated long chain alcohols containing about 10–20 and preferably about 12–14 carbon atoms, the alkali metal salts of the monosulfonates of monoglycerides such as sodium glyceryl monolaurate sulfonate, the sulfonates of succinic acid esters such as dioctyl sodium sulfosuccinate and the alkylaryl alkali metal sulfonates. Specific examples of presently preferred micelle-forming surfactants include sodium and potassium sulforicinoleate, tetrahydronaphthalene sulfonate, octahydroanthracene sulfonic acid, butyl naphthalene sulfonic acid, sodium xylene sulfonate, alkyl benzene sulfonic acid and potassium benzene sulfonate.

Sulfated long chain hydroxycarboxylic acids containing about 14–25 carbon atoms and preferably about 16–18 carbon atoms, and sulfated fats and oils containing hydroxycarboxylic acids of this type produce exceptionally good micelle-forming surfactants. At least 25% of the hydroxyl groups and preferably at least 50% should be sulfated, and up to 95–100% may be sulfated. It is usually preferred that the sulfated oils and/or long chain hydroxycarboxylic acids be neutralized with an alkali metal base, and that the corresponding alkali metal salts be added to the colloidal suspension in the form of an aqueous solution. The aqueous solution may contain at least 25% of water and preferably at least 35–40% by weight. Much larger percentages of water may be present when desired such as 75–80% or more by weight.

A very active catalyst is produced when using sulfated castor oil as the micelle-forming surfactant (Turkey Red oil.) Sulfated castor oil which has been purified sufficiently to be of U.S.P. or medicinal grade produces an exceptionally active catalyst. For the best results, the castor oil is reacted with about an equal weight of concentrated sulfuric acid(e.g., 20% by weight) at a temperature of approximately 25°–30°C. The mixture may be reacted for about 2 hours with stirring and is then neutralized with sodium hydroxide solution. The reaction mixture separates into three layers, i.e., an upper layer which is a water solution, an intermediate or oily layer, and a white curdy precipitate. The intermediate oily layer is separated from the upper and lower layers, and may be added to the colloidal suspension as the micelle-forming surfactant in an amount, for example, of 0.001–0.1 mole per liter, and preferably about 0.005 mole per liter.

The activity of the catalyst may be increased very markedly by cooling the aqueous catalyst suspension to a temperature approaching the freezing point such as about 0°–10°C., and then warming over one or more cycles. For best results, the aqueous catalyst suspension should be frozen and thawed over one or more cycles.

The reason for the increased catalytic activity is not fully understood at the present time but cooling and then warming the aqueous catalyst suspension seems to increase the concentration of the catalyst-containing micelles and/or increases the catalytic activity thereof.

The aqueous suspension of the catalyst contains a relatively small percentage by weight of the active catalyst as produced. When desired, it may be concentrated by evaporating a portion of the water to produce a concentrated liquid catalyst suspension which may be stored and used more conveniently. It is also possible to prepare a dry catalyst concentrate by evaporating substantially all of the water. The preferred method of producing the dry catalyst concentrate is by flash evaporation using a technique analogous to that employed in preparing powdered milk. The catalyst concentrates produced upon partial or complete evaporation of the water content of the initially prepared aqueous suspension may be reconstituted by addition of water with little or no loss of catalytic activity. Preferably, the water is added to the dry catalyst concentrate under sufficiently vigorous conditions of agitation to assure that the catalyst micelles are resuspended and uniformly distributed.

The aqueous catalyst suspension may be used as produced in practicing the invention, but preferably it is diluted with approximately 100–10,000 parts by weight of water and then used. For better results, the catalyst suspension should be diluted with about 250–2,000 parts by weight of water before use, and for best results it should be diluted with about 500–1,000 parts by weight of water before use. The surface active agent may be added thereto when desired as previously discussed. Alternatively the dry catalyst or liquid catalyst concentrate may be admixed with water and/or the surface active agent to provide an effective catalyst concentration in the quantities previously discussed. The weight of the catalyst is calculated on a dry solids basis, i.e., the weight of the catalyst ingredients in the aqueous suspension as produced after removal of the water.

The invention is further illustrated by the following specific examples.

EXAMPLE I

This example illustrates one presently preferred process for preparing the novel catalyst used in practicing the invention.

Anhydrous calcium chloride in an amount of 0.66 gram and magnesium sulfate heptahydrate in an amount of 1.32 grams were dissolved in 2 liters of deionized water with stirring and warming until solution was complete. Then 95 grams of sodium silicate pentahydrate having a molecular ratio of sodium oxide to silicon dioxide of 1:1 were added to the solution with stirring and continued warming to produce a white colloidal suspension of the reaction product.

After setting for 10 minutes, the colloidal suspension was heated to 80°C. and sulfated castor oil in an amount of 50 grams was added with stirring. The average molecular weight of the sulfated castor oil was 940 and it contained 50% of water. The turbidity lessened somewhat as the colloidal suspension was heated at 80°–90°C. for 1 hour with vigorous stirring to produce catalyst micelles. The aqueous suspension of catalyst micelles thus prepared had a viscosity similar to that of water and it was used as the catalyst in certain Examples as noted hereinafter.

A dry or solid catalyst concentrate was prepared in a further run by evaporating water from the initially prepared aqueous catalyst suspension. The resulting dry catalyst concentrate was resuspended in water and there was no substantial loss of catalytic activity. In still other runs, the catalytic activity of the aqueous suspension of catalyst as initially prepared, the diluted aqueous suspension of catalyst, and the reconstituted aqueous catalyst suspension was enhanced by freezing and thawing.

EXAMPLE II

This example illustrates the preparation of additional catalyst suspensions.

Five suspensions of the catalyst were prepared from the same ingredients as used in Example I and following the general procedure of Example I. The ratios of ingredients were varied as follows:

| Ingredient | Amount of Ingredient | | | | |
| --- | --- | --- | --- | --- | --- |
| | Run 1 | Run 2 | Run 3 | Run 4 | Run 5 |
| Deionized water | 2 l | 1.5 l | 1.5 l | 1.5 l | 0.25 l |
| $CaCl_2$ | 0.66 g | 0.5 g | 0.5 g | 1.0 g | 0.5 g |
| $MgSO_4.7H_2O$ | 1.32 g | 1.0 g | 1.0 g | 2.0 g | 1.0 g |
| $Na_2SiO_4.5H_2O$ | 165 g | 132 g | 71 g | 185 g | 71 g |
| Sulfated Castor oil (approximately 50% by weight $H_2O$) | 100 ml | 150 ml | 150 ml | 200 ml | 150 ml |

The catalyst suspensions prepared by the above five runs were used in certain examples as noted hereinafter.

EXAMPLE III

This example illustrates the use of the aqueous catalyst suspension prepared in accordance with Example I in washing windows and mirrors in a house.

A catalyst suspension prepared in accordance with Example I was diluted with 1,000 volumes of water to prepare the aqueous cleaning composition used in this Example. The resulting cleaning composition was used to wash windows which were filmed with foreign substances of the types usually encountered in households. In washing the windows, the cleaning composition was applied in excess with a clean cloth allowed to remain in contact with the glass surfaces for a few seconds, and then the windows were wiped with a dry clean cloth to remove the excess cleaning composition and foreign substances. The resulting cleaned windows were free of films, streaks and residues and the glass surfaces were bright and lustrous.

The above general procedure was also used to clean soiled mirrors in the house with comparable results. The glass surfaces of the cleaned mirrors were likewise bright and lustrous and free of films, streaks and residues.

Additional windows and mirrors in the house were cleaned with a commercially available cleaner (Windex) to obtain comparative data. The commercial cleaner required more effort and a longer period of time to obtain comparable results than the cleaning composition of the invention.

In a further run, one volume of the aqueous catalyst suspension prepared in accordance with Example I was added to the commercial cleaner and the resulting catalyzed solution was used to wash additional windows and mirrors. The cleaning action was noticeably faster

EXAMPLE IV

This example illustrates the use of an aqueous cleaning composition of the invention which contains a detergent in washing the windshields and windows of large transport trucks operated at high speeds on interstate highways. The windshields and windows were filmed with oily deposits from diesel engine exhausts, the roadbed and other sources and spotted with tightly adhering dried residua from insects killed when running at high speed.

The aqueous cleaning solution used at the time of this test for washing the windows and windshields was slow acting and a great deal of scrubbing was required. This was especially true with respect to the effort required for removing the tightly adhering insect deposits.

A catalyzed cleaning composition in accordance with the invention is prepared by diluting the aqueous catalyst suspension of Example I with 1,000 volumes of water and adding a commercially available detergent (TIDE-XK) at the rate of one cup per ten gallons. The resulting cleaning composition is used to wash the windshields and windows of several trucks. The cleaning composition is applied by means of a large wet sponge which is passed lightly over the soiled windshields and windows. The heavy scrubbing action which was required with the commercial cleaning solution in use prior to this test is not necessary. The catalyzed cleaning composition is allowed to remain in contact with the windshields and windows for approximately 1-5 minutes, and then the glass surfaces are flushed with tap water from a hose. The windshields and windows dry free of streaks or films and the surfaces are clean and bright. Less than one half as much time is required as when using the commercial cleaning solution.

EXAMPLE V

This example illustrates the use of the aqueous cleaning composition of the invention in washing automobile windows and windshields which are soiled but not heavily filmed with oily deposits and residues. The windshields and windows have the usual type of foreign substances thereon encountered in intown driving.

The aqueous catalyst suspension prepared in accordance with Example I is diluted with 1,000 volumes of water and the resulting catalyzed aqueous cleaning composition is used to wash automobile windshields and windows. The cleaning composition is applied to the windows and windshields by means of a sponge, allowed to remain in contact with the glass surfaces for a few seconds, and then wiped with a paper towel.

The catalyzed aqueous cleaning composition is very effective and the wiping action with the paper towel results in the removal of the foreign substances from the glass surfaces with very little effort and within a few seconds. No streaks or residual films remain on the glass surfaces. The cleaning action is much faster and much less effort is required than with the commercial cleaning solution used prior to this test.

EXAMPLE VI

An aqueous catalyst suspension was prepared in accordance with the procedure of Example I. The water content was removed by evaporation to produce a dried catalyst concentrate.

The dried catalyst concentrate and a commercially available detergent (TIDE-XK) are admixed in proportions to provide one weight per cent of the catalyst in the resulting catalyzed detergent composition. A portion of the admixture thus prepared is added to water at the rate of one cup per 10 gallons and the resulting aqueous solution is used in washing truck windshields and windows following the general procedure of Example IV. The admixture of catalyst and detergent when added to water, is as effective in washing truck windshields and windows as the separate additions of catalyst and detergent used in Example IV.

EXAMPLE VII

The general procedures of Examples III through VI are repeated in a series of runs with the exception of using catalysts prepared in accordance with Example II. The catalysts of Example II are active and produce comparable results.

I claim:

1. In a method of cleaning the surface of glass windows and mirrors having at least one undersirable foreign substance thereon wherein the glass surface is intimately contacted with an aqueous cleaning composition and at least a portion of the foreign substance is removed from the glass surface, the improvement comprising intimately contacting the said glass surface with an aqueous cleaning composition containing water and an effective amount of a catalyst, the catalyst being prepared by a process comprising admixing a water soluble alkali metal silicate with an aqueous medium containing a dissolved substance which provides calcium ions in the aqueous medium and a dissolved substance which provides magnesium ions in the aqueous medium, the aqueous medium containing said dissolved substances in amounts to provide a total concentration in the aqueous medium between about $1 \times 10^{-4}$ and $1 \times 10^{-1}$ mole per liter each of calcium ions and magnesium ions, the aqueous medium containing said dissolved substances in amounts to provide a molar ratio of calcium ions to magnesium ions between about 2.0:1.0 and 1.0:2.0, the alkali metal silicate having an alkali metal oxide to silicon dioxide ratio between about 0.9:1.0 and less than 2.0:1.0 and being admixed with the aqueous medium in an amount of about 0.05-2 moles per liter, reacting the alkali metal silicate with said dissolved substances providing calcium ions and magnesium ions to produce an aqueous suspension of finely divided particles of the reaction product, admixing a micelle-forming surfactant with the aqueous medium in an amount to form catalyst micelles including said finely divided particles of the reaction product upon agitating the aqueous medium, and agitating the aqueous medium containing said finely divided particles of the reaction product and surfactant to form said catalyst micelles, the said resulting aqueous medium being diluted with at least 100 volumes of water prior to cleaning the surface of glass windows and mirrors therewith and the said catalyst micelles being present therein in a concentration effective to promote the removal of the said foreign substance.

2. The method of claim 1 wherein in the process for preparing the catalyst, said ratio of calcium ions to magnesium ions is between about 1.5:1.0 and 1.0:1.5.

3. The method of claim 1 wherein in the process for preparing the catalyst, said ratio of calcium ions to magnesium ions is about 1.0:1.0.

4. The method of claim 1 wherein in the process for preparing the catalyst, the alkali metal silicate is admixed with an aqueous medium containing said dissolved substances in amounts to provide a total concentration in the aqueous medium of between about $1 \times 10^{-3}$ and $6 \times 10^{-3}$ mole per liter each of calcium ions and magnesium ions.

5. The method of claim 1 wherein in the process for preparing the catalyst, the alkali metal silicate is admixed with an aqueous medium containing said dissolved substances in amounts to provide a total concentration in the aqueous medium of between about $2.5 \times 10^{-3}$ and $3.0 \times 10^{-3}$ mole per liter each of calcium ions and magnesium ions.

6. The method of claim 1 wherein in the process for preparing the catalyst, about 0.2–0.5 mole per liter of the alkali metal silicate is admixed with the aqueous medium.

7. The method of claim 1 wherein in the process for preparing the catalyst, the alkali metal silicate has an alkali metal oxide to silicon dioxide ratio between about 0.9:1.0 and 1.2:1.0.

8. The method of claim 1 wherein in the process for preparing the catalyst, the alkali metal silicate is alkali metal metasilicate having an alkali metal oxide to silicon dioxide ratio of about 1.0:1.0.

9. The method of claim 1 wherein in the process for preparing the catalyst, about 0.01-0.1 mole per liter of the surfactant is admixed with the aqueous medium.

10. The method of claim 1 wherein in the process for preparing the catalyst, the surfactant comprises sulfated castor oil.

11. The method of claim 1 wherein in the process for preparing the catalyst, the alkali metal silicate is admixed with an aqueous medium containing said dissolved substances in amounts to provide a total concentration in the aqueous medium of between about $1 \times 10^{-3}$ and $6 \times 10^{-3}$ mole per liter each of calcium ions and magnesium ions, the ratio of calcium ions to magnesium ions is between about 1.5:1.0 and 1.0:1.5, about 0.2-0.5 mole per liter of the alkali metal silicate is admixed with the aqueous medium, and the alkali metal silicate has an alkali metal oxide to silicon dioxide ratio between about 0.9:1.0 and 1.2:1.0.

12. The method of claim 1 wherein in the process for preparing the catalyst, the alkali metal silicate is admixed with an aqueous medium containing said dissolved substances in amounts to provide a total concentration in the aqueous medium of between about $2.5 \times 10^{-3}$ and $3.0 \times 10^{-3}$ mole per liter each of calcium ions and magnesium ions, the aqueous medium contains about equimolar amounts of calcium ions and magnesium ions, about 0.2–0.3 mole per liter of the alkali metal silicate is admixed with the aqueous medium, and the alkali metal silicate has an alkali metal oxide to silicon dioxide ratio of about 1.0:1.0.

13. The method of claim 12 wherein in the process for preparing the catalyst, the alkali metal metasilicate is sodium metasilicate having an alkali metal oxide to silicon dioxide ratio of about 1.0:1.0.

14. The method of claim 12 wherein in the process for preparing the catalyst, about 0.01–0.1 mole per liter of the surfactant is admixed with the aqueous medium.

15. The method of claim 14 wherein in the process for preparing the catalyst, the surfactant comprises sulfated castor oil.

16. The method of claim 15 wherein in the process for preparing the catalyst, the alkali metal metasilicate is sodium metasilicate having a sodium oxide to silicon dioxide ratio of about 1.0:1.0.

17. The method of claim 16 wherein in the process for preparing the catalyst, at least 25% of the hydroxy groups of the castor oil are sulfated, and about 0.03–0.07 mole per liter of the sulfated castor oil is admixed with the aqueous medium.

18. The method of claim 12 wherein in the process for preparing the catalyst, the alkali metal silicate is admixed with an aqueous medium containing said dissolved substances in amounts to provide a total concentration in the aqueous medium of about $2.9 \times 10^{-3}$ mole per liter of calcium ions and about $2.7 \times 10^{-3}$ mole per liter of magnesium ions, about 0.25 mole per liter of sodium metasilicate having a sodium oxide to silicon dioxide ratio of about 1.0:1.0 is admixed with the aqueous medium, the aqueous medium contains not more than 10 parts per million by weight of carbonate ion and bicarbonate ion, the surfactant comprises sulfated castor oil and at least 50% of the hydroxy groups of the castor oil are sulfated, and about 0.05 mole per liter of the sulfated castor oil is admixed with the aqueous medium.

19. In a method of cleaning the surface of glass windows and mirrors wherein the glass surface is intimately contacted with an aqueous cleaning composition containing water and an active ingredient comprising at least one material selected from the group consisting of (1) a surface active agent, and (2) a combination of a surface active agent and a water softening agent, the glass surface having at least one undesirable foreign substance on the surface thereof and being intimately contacted with the aqueous cleaning composition under conditions whereby at least a portion of the undesirable foreign substance is removed from the glass surface, the improvement in combination therewith comprising intimately contacting the said glass surface having the undesirable foreign substance thereon with the said aqueous cleaning composition in the presence of an effective amount of a catalyst, the catalyst being prepared by a process comprising admixing a water soluble alkali metal silicated with an aqueous medium containing a dissolved substance which provides calcium ions in the aqueous medium and a dissolved substance which provides magnesium ions in the aqueous medium, the aqueous medium containing said dissolved substances in amounts to provide a total concentration in the aqueous medium between about $1 \times 10^{-4}$ and 1 × 10⁻¹ mole per liter each of calcium ions and magnesium ions, the aqueous medium containing said dissolved substances in amounts to provide a molar ratio of calcium ions to magnesium ions between about 2.1:1.0 and 1.0:2.0, the alkali metal silicate having an alkali metal oxide to silicon dioxide ratio between about 0.9:1.0 and less than 2.0:1.0 and being admixed with the aqueous medium in an amount of about 0.05–2 moles per liter, reacting the alkali metal silicate with said dissolved substances providing calcium ions and magnesium ions to produce an aqueous suspension of finely divided particles of the reaction product, admixing a micelle-forming surfactant with the aqueous medium in an amount to form catalyst micelles including said finely divided particles upon agitating the aqueous medium, and agitating the aqueous medium containing the said finely divided particles and surfactant to form said catalyst micelles, the said resulting aqueous medium being diluted with at least 100 volumes of water prior to cleaning the surface of glass windows and mirrors therewith and the said catalyst micelles being present therein in a concentration effective to promote the removal of the said foreign substance.

20. The method of claim 19 wherein the said active ingredient of the aqueous composition comprises a major proportion of a mixture of (a) at least one surface active agent, and (b) at least one water softening agent.

21. The method of claim 19 wherein in the process for preparing the catalyst, said ratio of calcium ions to magnesium ions is between about 1.5:1.0 and 1.0:1.5.

22. The method of claim 19 wherein in the process for preparing the catalyst, said ratio of calcium ions to magnesium ions is about 1.0:1.0.

23. The method of claim 19 wherein in the process for preparing the catalyst, the alkali metal silicate is admixed with an aqueous medium containing said dissolved substances in amounts to provide a total concentration in the aqueous medium of between about 1 × 10⁻³ and 6 × 10⁻³ mole per liter each of calcium ions and magnesium ions.

24. The method of claim 19 wherein in the process for preparing the catalyst, the alkali metal silicate is admixed with an aqueous medium containing said dissolved substances in amounts to provide a total concentration in the aqueous medium of between about 2.5 × 10⁻³ and 3.0 × 10⁻³ mole per liter each of calcium ions and magnesium ions.

25. The method of claim 19 wherein in the process for preparing the catalyst, about 0.2–0.5 mole per liter of the alkali metal silicate is admixed with the aqueous medium.

26. The method of claim 19 wherein in the process for preparing the catalyst, the alkali metal silicate has an alkali metal oxide to silicon dioxide ratio between about 0.9:1.0 and 1.2:1.0.

27. The method of claim 19 wherein in the process for preparing the catalyst, the alkali metal silicate is alkali metal metasilicate having an alkali metal oxide to silicon dioxide ratio of about 1.0:1.0.

28. The method of claim 19 wherein in the process for preparing the catalyst, about 0.01–0.1 mole per liter of the sufactant is admixed with the aqueous medium.

29. The method of claim 19 wherein in the process for preparing the catalyst, the surfactant comprises sulfated castor oil.

30. The method of claim 19 wherein in the process for preparing the catalyst, the alkali metal silicate is admixed with an aqueous medium containing said dissolved substances in amounts to provide a total concentration in the aqueous medium of between about 1 × 10⁻³ and 6 × 10⁻³ mole per liter each of calcium ions and magnesium ions, the ratio of calcium ions to magnesium ions is between about 1.5:1.0 and 1.0:1.5, about 0.2–0.5 mole per liter of the alkali metal silicate is admixed with the aqueous medium, and the alkali metal silicate has an alkali metal oxide to silicon dioxide ratio between about 0.9:1.0 and 1.2:1.0.

31. The method of claim 19 wherein in the process for preparing the catalyst, the alkali metal silicate is admixed with an aqueous medium containing said dissolved substances in amounts to provide a total concentration in the aqueous medium of between about 2.5 × 10⁻³ and 3.0 × 10⁻³ mole per liter each of calcium ions and magnesium ions the aqueous medium contains about equimolar amounts of calcium ions and magnesium ions, about 0.2–0.3 mole per liter of the alkali metal silicate is admixed with the aqueous medium, and the alkali metal silicate has an alkali metal oxide to silicon dioxide ratio of about 1.0:1.0.

32. The method of claim 31 wherein in the process for preparing the catalyst, the alkali metal metasilicate is sodium metasilicate having an alkali metal oxide to silicon dioxide ratio of about 1.0:1.0.

33. The method of claim 31 wherein in the process for preparing the catalyst, about 0.01–0.1 mole per liter of the surfactant is admixed with the aqueous medium.

34. The method of claim 33 wherein in the process for preparing the catalyst, the surfactant comprises sulfated castor oil.

35. The method of claim 34 wherein in the process for preparing the catalyst, the alkali metal metasilicate is sodium metasilicate having a sodium oxide to silicon dioxide ratio of about 1.0:1.0.

36. The method of claim 35 wherein in the process for preparing the catalyst, at least 25% of the hydroxy groups of the castor oil are sulfated, and about 0.03–0.07 mole per liter of the sulfated castor oil is admixed with the aqueous medium.

37. The method of claim 36 wherein in the process for preparing the catalyst, the alkali metal silicate is admixed with an aqueous medium containing said dissolved substances in amounts to provide a total concentration in the aqueous medium of about 2.9 × 10⁻³ mole per liter of calcium ions and about 2.7 × 10⁻³ mole per liter of magnesium ions, about 0.25 mole per liter of sodium metasilicate having a sodium oxide to silicon dioxide ratio of about 1.0:1.0 is admixed with the aqueous medium, the aqueous medium contains not more than 10 parts per million by weight of carbonate ions and bicarbonate ions, the surfactant comprises sulfated castor oil and at least 50% of the hydroxy groups of the castor oil are sulfated, and about 0.05 mole per liter of the sulfated castor oil is admixed with the aqueous medium.

* * * * *